United States Patent [19]
Klupsch

[11] 4,435,432
[45] Mar. 6, 1984

[54] PROCESS FOR THE PRODUCTION OF STABLE CURDLED MILK PRODUCTS

[75] Inventor: Hans J. Klupsch, Hamm, Fed. Rep. of Germany

[73] Assignee: EVOG - Etablissement für Verwaltung und Organisation, Liechtenstein

[21] Appl. No.: 379,894

[22] Filed: May 19, 1982

[30] Foreign Application Priority Data

May 22, 1981 [DE] Fed. Rep. of Germany ....... 3120505

[51] Int. Cl.$^3$ ........................ A23C 9/12; A23C 21/06; C12N 1/20; C12R 1/01
[52] U.S. Cl. ........................................ 426/43; 426/34; 426/583; 435/253; 435/822
[58] Field of Search ..................... 426/34, 42, 43, 580, 426/583, 61; 435/253, 822

[56] References Cited

U.S. PATENT DOCUMENTS 4,187,321  2/1980  Mutai et al. ........................... 426/43
4,298,619  11/1981 Mutai et al. ........................... 426/43

FOREIGN PATENT DOCUMENTS 2421084  11/1975  Fed. Rep. of Germany ........ 426/34
53-32160  3/1978  Japan ..................................... 426/34

Primary Examiner—Thomas G. Wiseman
Assistant Examiner—Marianne S. Minnick
Attorney, Agent, or Firm—Scully, Scott, Murphy & Presser

[57] ABSTRACT

A process for the production of a stable curdled milk product through inoculation of a raw milk material with bacteria cultures which facilitate the formation of a stable, curdled milk product containing exclusively dextrorotatory lactic acid and which is extensively protected from phages attack. The process achieves this purpose in that the raw milk material is inoculated with a bacterial culture of *Bifido bacterium longum* C Kl 1969 (DSM 2054) strain.

8 Claims, No Drawings

PROCESS FOR THE PRODUCTION OF STABLE CURDLED MILK PRODUCTS

BACKGROUND OF THE INVENTION

1. Field of the Invention

The present invention relates to a process for the production of stable curdled milk products through the inoculation of a raw milk material with bacteria cultures.

2. Discussion of the Prior Art

Until recent times, during the production of stable curdled milk products, a raw milk material such as, for instance, such as whole milk or skim milk, is inoculated with mixed cultures which, as a rule, contain strains belonging to two different types of bacteria. Heretofore, yoghurt-like, stable curdled milk products with a pleasant aroma have been obtained when the mixed culture, in addition to bacilli characteristic for the product, of the type *Lactobacillus bulgaricus*, also contained bacteria of the type *Streptococcus thermophilus*. *Lactobacillus bulgaricus* strains curdle milk extensively up to a pH of 3.65 and are responsible for the typical yoghurt aroma. However, this type of bacteria is disadvantageous in that it produces the undesirable D(−) lactic acid (levorotatory) and does not deliver a stable product but merely a loose coagulate. In contrast therewith, the second type of bacteria present in the mixed culture, *S. thermophilus* curdles the milk only relatively weakly up to a pH of 4.8 and does not deliver a typical yoghurt aroma. Contrastingly, this type of bacteria produces the desired L(+) lactic acid (dextrorotatory) and, as a result, is responsible for the curdled milk product becoming stable. Inasmuch as neither of the two types of bacteria which are employed in a typical yoghurt culture in themselves possess the required metabolic properties which are essential to the sought-after aromatic and stable curdled milk product, both types must be employed conjointly. However, the disadvantages of both must also be concurrently taken into consideration. The following table illustrates the advantageous and disadvantageous properties of the bacteria strains which are utilized in the mixed cultures pursuant to the present state of the art.

| Bacteria type | Advantages | Disadvantages |
| --- | --- | --- |
| L. bulgaricus | aroma formation, rapid curdling | formation of bitter components, curdling, formation of D(−) lactic acid, no stable product |
| S. thermophilus | stable product, no after curdling, formation of L(+) lactic acid | slow curdling, no aroma |

Since recently doubts have been expressed in an increasing measure from a medical standpoint about the use of levorotatory lactic acid, the World Health Organization (WHO) recommends that the daily intake of D(−) lactic acid be restricted to 100 mg per kilogram of body weight. Inasmuch as stable curdled milk products, such as yoghurt, are consumed in large amounts, it appears to be of great importance to extensively reduce the quantity of D(−) lactic acid in such products. However, until now it has not been possible to produce stable curdled milk products with rod bacillus-like lactobacilli which do not contain D(−) lactic acid.

In the utilization of strains of bacteria, for instance of the *Lactobacillus bifidus* type, which produce only the desired dextrorotatory lactic acid, until the present time there could only be produced only liquid curdled milk products. Accordingly, it has been attempted to produce stable curdled milk products through the use of mixed cultures which also contain strains producing only dextrorotatory lactic acid. Nevertheless, these were displaced within a short time span by strains of bacteria present in the culture which produce the levorotatory lactic acid. For example, when a raw milk product is inoculated with a mixed culture which contains the same proportion of levorotatory lactic acid producing lactobacilli and the dextrorotatory lactic acid producing strain of the bacteria, *Bifido bacterium longum*, within a few days the latter is displaced by the ratio of 1000:1.

A further problem which is encountered in the utilization of bacteria cultures which do not contain mixtures of the different types of material, but only one or more strains of a single type of bacteria, is the danger of attack by phages. Since, as a rule, phages evidence only a narrow selective effectiveness, in essence, they will mostly infect bacteria of one type: in actual practice one can protect from attack by phages by using mixtures which contain strains of different types of bacteria. In the case of an attack by phages, at a minimum there is eliminated, only one type of bacteria so that the ripening or digesting process will not be entirely disrupted. Consequently, in the current state of technology it has not been considered feasible to employ so-called mono-cultures with the utilization of only one type of bacteria as the inoculating material for stable curdled milk products.

SUMMARY OF THE INVENTION

Accordingly, it is an object of the present invention to provide a process for the production of stable curdled milk products through the inoculation of a raw milk material with bacteria cultures which facilitate the formation of a stable curdled milk product which contains exclusively dextrorotatory lactic acid and is extensively protected from attack by phages.

The foregoing object is achieved, in accordance with the present invention, by a process in which the raw milk material is inoculated with a bacterial strain of *Bifido bacterium longum* which produces dextrorotatory lactic acid to thereby produce a stable curdled milk product.

More specifically, the invention contemplates a process in which the bacterial strain utilized for the inoculation of the raw milk material is *Bifido bacterium longum* C K1 1969 (DSM 2054).

Through the inoculation of a raw milk product material with a bacterial culture of the strain *Bifido bacterium longum*, in lieu of a liquid, drinkable product as has been heretofore obtained, in a completely surprising manner there is obtained a stable or semi-solid curdled milk product which, moreover, contains exclusively dextrorotatory lactic acid. The inventive bacteria strain was obtained through a lengthy, stepwise selection process during which there were essentially changed, in a stepwise sequence, the conditions of the nutrient medium. The *Bifido bacterium longum* C K1 1969 strain was deposited in the official depository "Deutsche Sammlung on Mikroorganismen" under the Number DSM 2054, on Mar. 11, 1981.

Through the utilization of the inventive strain, for the first time there has been made available an inoculating culture for the production of stable curdled milk products which does not consist of a mixture of bacteria cultures the undesirable disadvantages of which must be taken into contention. The inventive strain exclusively produces the desired dextrorotatory lactic acid and delivers an excellent, typical "bifidus aroma". With the utilization of the inventive strain, there is additionally obtained at a completely unexpected curdling time of merely 4 hours, the intended pH value of 4.75. In contrast therewith, the usual curdling periods in the current state of the art lie between 16 to 25 hours. Through this unexpected effect of the surprisingly rapid curdling there is especially eliminated the danger of attack by phages, inasmuch as phages are sensitive to acid so that, within the short period at the above-mentioned low pH value, they will not noticeably propagate and, as a result, the inoculating culture cannot be injured to an appreciable extent.

The extremely short curdling time additionally provides significant technological processing advantages, due to the substantial decrease in the production period, e.g. up to 20 hours.

The major advantage attained in the employment of the present inventive strain resides in that, for the first time, there can be produced within an extremely short period, a stable and aromatic curdled milk product which is extensively resistant to phage attack, and which contains exclusively dextrorotatory lactic acid.

In a usual inoculating culture, the inventive strain is contained within a nutrient medium constituted of yeast autolysate, peptone obtained from casein, dextrose, milk and water in a cell count of a total of $1 \times 10^9$ cells/ml of nutrient medium.

With respect to the taste and consistency of the present stable or semi-solid curdled milk product, it is particularly advantageous to inoculate the raw milk material with about 1 to 10%, preferably 5%, of bacteria culture.

For the production of a yoghurt with a normal fat content, whole milk is employed as the raw milk material.

If desired, skim milk can also be utilized for the production of the stable curdled milk product.

It has also been determined that it is of special advantage for the consistency and the taste of the stable curdled milk product when natural whey protein is added to the raw milk material, particularly at levels of 0.5 to 3%, and preferably 1.5% w/v.

The stable curdled milk product which is produced by means of the inventive strain is particularly distinguished in that no gelatin need be added thereto.

Hereinbelow there are set forth examples of the inventive process.

EXAMPLE 1

Whole milk or skim milk, or low-fat milk or cream is heated to 125° C. subsequent to the addition of 1.5% of a natural whey protein, cooled to 50° C. and inoculated at this temperature with 5% of *Bifido bacterium longum* C K1 1969 strain. Filling into ready-for-purchase containers is effected, preferably into plastic cups or glass containers of 150 g. content. After sealing of the containers, the contents are cultured at 42° C. for 4 to 6 hours and cooled down at a pH value of 4.85. The final pH value after cooling constituted 4.75. The product contained exclusively viable bacteria of the *Bifido bacterium longum* C K1 1969, DSM 2054 strain. After storage for 20 hours at 5° C., the product evidences the typical bifidus aroma and has an excellent stable or semi-solid consistency.

EXAMPLE 2

Whole milk or skim milk, or low fat milk or cream is admixed with 1.5% of a natural whey protein, heated to 125° C., then cooled to 50° C. and inoculated at this temperature with 5% of *Bifido bacterium longum* C K1 1969 strain. Filling into ready-for-purchase containers is effected, preferably into plastic cups or glass receptacles of 150 g. content, into which there is dosed between 14 and 22% of a fruit preparate. After sealing of the containers, the contents are cultured at 42° C. for 4 to 6 hours and then cooled down at a pH value of 4.85. The final pH value after cooling constituted 4.75. The product contained exclusively viable bacteria of *Bifido bacterium longum* C K1 1969, DSM 2054 strain. After storage for 20 hours at 5° C., the product evidences the typical bifidus aroma and has an excellent stable or semi-solid consistency.

What is claimed is:

1. A process for the production of semi-solid curdled milk products, comprising inoculating and fermenting raw milk material with a bacterial strain of *Bifidobacterium longum* CK1 1979 (DSM 2054) under conditions suitable for the formation of said semi-solid curdled milk product.

2. The process of claim 1 which further comprises culturing the strain of *Bifidobacterium longum* in a milk-containing nutrient medium.

3. The process of claim 1 wherein the raw milk material is inoculated with a 1 to 10% bacteria culture.

4. The process of claim 3 wherein the raw milk material is inoculated with a 5% bacteria culture.

5. The process of claim 1 wherein the raw milk material comprises whole milk.

6. The process of claim 1 wherein the raw milk material comprises skim milk.

7. The process of claim 1 which further comprises adding 0.5 to 3% of natural whey protein to the raw milk material.

8. The process of claim 7 which further comprises adding 1.5% of natural whey protein to the raw milk material.

* * * * *